(No Model.) 2 Sheets—Sheet 1.
G. T. WARWICK.
BALL BEARING.
No. 590,713. Patented Sept. 28, 1897.
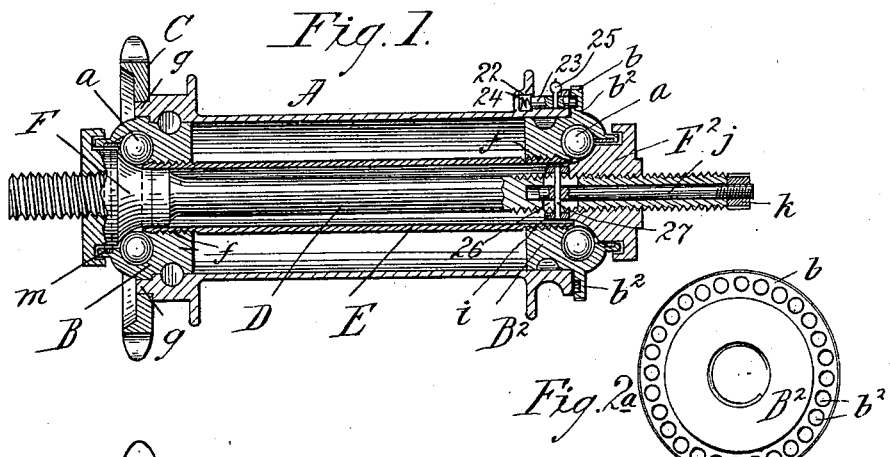
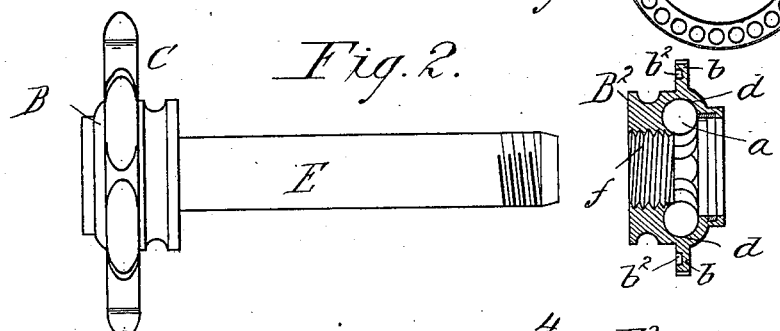
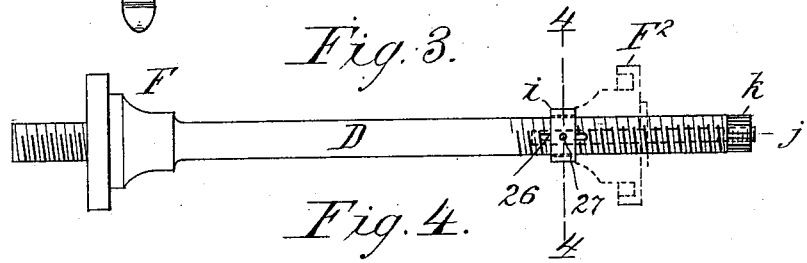
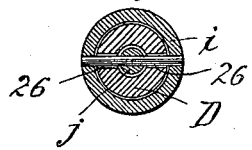
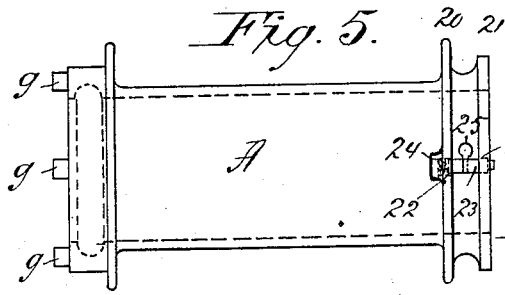
Witnesses.
A. W. Allen
A. W. Smith
Inventor;
Geo. T. Warwick,
by
Attorney.

(No Model.) 2 Sheets—Sheet 2.

G. T. WARWICK.
BALL BEARING.

No. 590,713. Patented Sept. 28, 1897.

Witnesses
A. W. Allen
Geo. H. Snyder

Inventor,
Geo. T. Warwick,
by Wm. S. Bellows
Attorney.

THE NORRIS PETERS CO., PHOTO-LITHO., WASHINGTON, D. C.

UNITED STATES PATENT OFFICE.

GEORGE T. WARWICK, OF NEWARK, NEW JERSEY.

BALL-BEARING.

SPECIFICATION forming part of Letters Patent No. 590,713, dated September 28, 1897.

Application filed October 10, 1896. Serial No. 608,519. (No model.)

*To all whom it may concern:*

Be it known that I, GEORGE T. WARWICK, a subject of the Queen of Great Britain, and a resident of Newark, in the county of Essex and State of New Jersey, have invented certain new and useful Improvements in Ball-Bearings for Cycles and other Vehicles, of which the following is a specification.

This invention relates to improved constructions of ball-bearing mechanism for bicycles and analogous vehicles; and the improvements particularly relate to a combination, with a hub-barrel or like part in which the bearings are comprised, of the ball-cases which are removably provided in each end of the barrel and a novel means for connecting the ball-cases and confining them in the barrel; to a means of confining the sprocket upon the hub or barrel without the use of externally-applied bolts or nuts; to a "deadlock," as termed, by means of which the adjustment of the cones is rendered more perfect and certain against derangement; to a simplified device for the retention of the balls in the ball-cases, whereby when the cone is removed the balls will not be spilled, and to a novel means for locking the removable ball-cases against being unduly turned within the hub or barrel to change or effect the cone adjustment or otherwise impair the desirability of the bearings.

The invention consists in the constructions and combinations of parts, all substantially as will hereinafter fully appear, and be set forth in the claims.

The improvements are illustrated in the accompanying drawings, in which—

Figure 6:
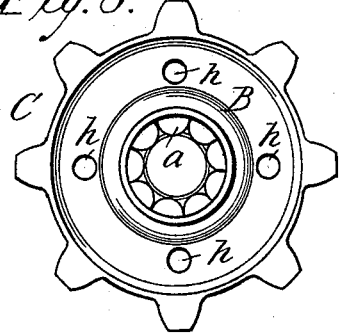
Figure 7:
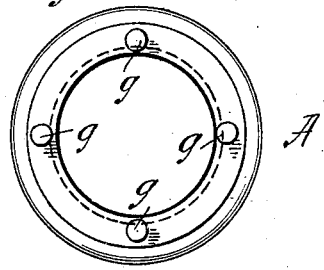
Figure 9:
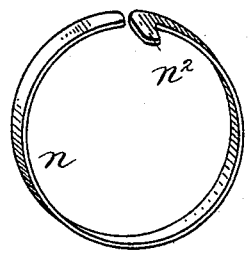
Figure 8:
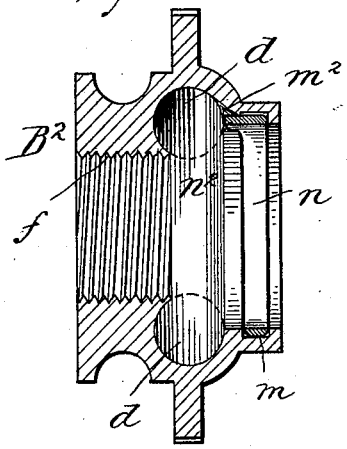
Figure 10:
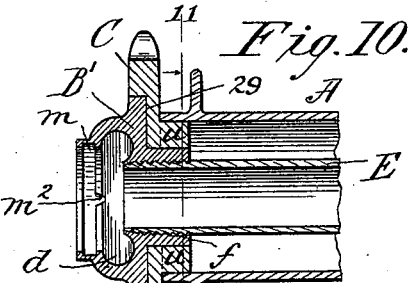
Figure 11:
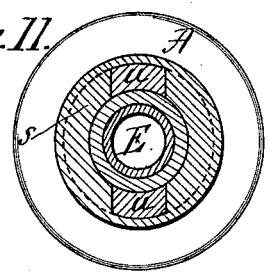
Figures 12, 13:
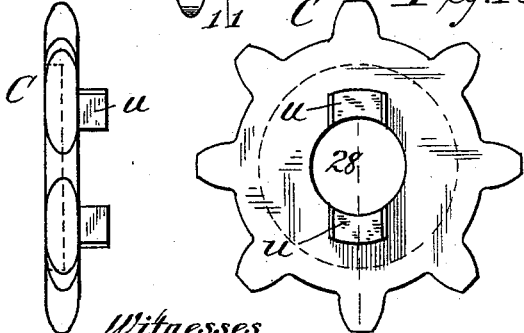
Figure 14:
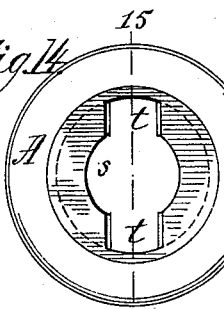
Figure 15:
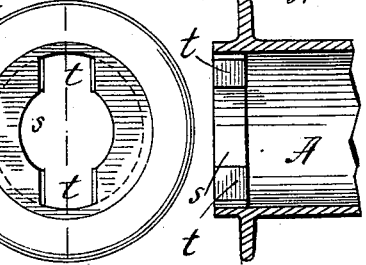

Figure 1 is a central axial sectional view through a bicycle-wheel hub and sprocket-wheel and bearings. Fig. 2 is in part a side view of a one end ball-case and the sprocket-wheel and the locking-tube and in part a central sectional view of the other end ball-case detached from such tube. Fig. 2$^a$ is an inner end view of the ball-case. Fig. 3 is a side view of the shaft or axle, showing thereon a cone at one end, showing near the other end the adjustable stop and dead-lock, and showing by dotted lines the other cone in its given adjusted position. Fig. 4 is a cross-sectional view, enlarged, on line 4 4, Fig. 3. Fig. 5 is a side view of the hub or barrel. Fig. 6 is an end view of the ball-case and sprocket-wheel shown at the left of Fig. 1. Fig. 7 is an end view of the hub with which the last-named ball-case and sprocket has an interlocking engagement. Fig. 8 is a sectional view, enlarged, of one of the ball-cases, particularly illustrating the novel ball-retainer. Fig. 9 is a perspective view of the peculiarly-constructed split spring retainer-ring. Fig. 10 is a sectional view of an end portion of the hub, showing the sprocket-wheel formed separately from the ball-case, said wheel and case being detachably confined and interlocked in the hub. Fig. 11 is a cross-sectional view on line 11 11, Fig. 10. Figs. 12 and 13 are edge and rear face views of the sprocket-wheel shown in Fig. 10, and Figs. 14 and 15 are respectively an end view of the hub and a longitudinal sectional view of an end portion of the hub shown in Fig. 10.

Similar characters of reference indicate corresponding parts in all the views.

In the drawings, A represents the hub or barrel.

B B$^2$ represent the ball-cases, of annular form; C, the sprocket-wheel, provided for and connected at one end of the hub; D, the shaft or axle; E, the locking-tube; F F$^2$, the cones, and $a$ $a$ are the balls.

The barrel or hub is formed with a cylindrical bore, within which the ball-cases are set with a close sliding fit.

In Figs. 1, 2, and 6 the ball-case B is represented as being integrally formed with the sprocket-wheel. Each ball-case has a flange to overlie the end of the hub, the case B$^2$ having its flange $b$ provided within its rear face with the series of recesses $b^2$, while the sprocket-wheel C constitutes the flange for the ball-case B. Each of the annular ball-cases has the annular ball-race $d$, and at its portion endwise inside of the ball-race it is internally screw-threaded, as seen at $f$. One ball-case—for instance, the one B—is forced within the one end of the hub. The locking-tube E, externally threaded at both its end portions, is screwed into the internally-threaded screw-socket in such ball-case, leaving the opposite end of the tube centrally within the other end of the hub, whereupon the other ball-case B$^2$ is screw-engaged with the tube and as it is turned is drawn endwise into the hub.

The end of the hub at which the ball-case B² is provided and which has the double flange 20 21 has formed within such flanged portion and opening to the end of the wall of the hub the socket 22, within which plays the short cylindrical bar 23, the latter being movable endwise in the aforesaid socket therefor against the spring 24 in the base of the socket. This bar 23 has the laterally-extended knob 25, whereby it may be moved endwise to retract its outer end from engagement in the aforesaid recesses $b^2$ of the flange $b$, extending edgewise from the ball-case B². Therefore when the last-described catch device is in engagement with the recessed flange of one of the ball-cases neither of the latter can be removed from within the hub.

In Figs. 1, 5, and 7 the end of the hub at which the sprocket is applied is provided with the endwise-extending pins or studs $g$ $g$, and the web or body of the sprocket-wheel C has correspondingly-arranged sockets $h$ $h$ to match with the aforesaid studs $g$. As indicated in Fig. 1, the ends of the studs are flush with and form a continuation of the outer face of the sprocket-wheel. In said Fig. 1 the sprocket-wheel is represented as being formed integrally with the ball-case B, and this construction is preferable except in cases where there is required an interchangeable sprocket-wheel.

The shaft or axle D has the cones provided thereon substantially as usual. The cone F may be removably formed on or affixed to the shaft, while the cone F² is detachably applied by the screw-thread engagement. The inner end of this cone F² is in bearing against a shoulder therefor constituted by the collar $i$, which slides loosely over the externally-threaded shaft. The shaft is axially drilled from and within the end at which the cone F² is provided, and in this longitudinal passage so formed is inserted a rod $j$, which is adapted to slide endwise, its outer end being screw-threaded and receiving thereon the peripherally-knurled nut $k$, which jams against the end of the axle D. The portion of the shaft D which is encircled by the aforesaid collar $i$ is transversely slotted, as seen at 26, and a pin 27 is passed through the collar $i$ from side to side, traversing the slot and centrally penetrating the inner end portion of the aforesaid rod $j$.

By loosening the nut $k$ and moving the rod $j$ inwardly, correspondingly inwardly placing the collar, the movable cone F² may be nicely adjusted for the most efficient action of the ball-bearings, whereupon by turning up the aforesaid nut $k$ the collar will be brought firmly against the inner end of the said cone F², serving as a positive shoulder and deadlock against any force which would tend to set up the cone, so as to bind the bearings.

Of course it is understood that in this, as in other bearings, one cone in its movements adjusts the bearings at both ends of the hub or barrel.

Each of the ball-races, as shown in the drawings, Figs. 1, 8, and 10, has its annular mouth or orifice of less width than the diameter of the balls contained therein.

The internal wall of the annular part of each ball-case endwise outside of the ball-race has the annular groove $m$, which at one point in its circular course is intersected by the niche $m^2$, which leads transversely therefrom toward and into the ball-race. Manifestly at this one place the balls may be one at a time entered within the race. The balls are prevented against escape by the split spring-rim $n$, which is provided with the transverse lip or extension $n^2$, which lies within the aforesaid niche $m^2$. (See especially Figs. 8 and 9.) For the insertion or removal of the balls the spring-ring retainer may be very readily removed by the thumb-nail or a knife-blade.

In Fig. 10 the ball-case B' and sprocket-wheel are shown as separately formed. The sprocket-wheel, as seen in Fig. 13, has a central circular opening 28, and this sprocket-wheel has an interlocking engagement with the end of the hub, substantially as hereinbefore described with relation to the construction shown in Figs. 1, 6, and 7, but by means of interlocking portions, which specifically and in detail are of somewhat different form. The sprocket-wheel of Fig. 10 has the annular seat 29, within which the circular body of the ball-case B', here shown, is seated, and the ball-case has the inwardly-extended central hub internally threaded, which hub extends within or through the aforesaid opening 28 in the sprocket-wheel. Here the tube E, as in Fig. 1, engages the internally-threaded portion of the ball-case, holding the ball-case against the sprocket-wheel, and thereby holding the sprocket-wheel to its interlocked engagement with the end of the hub. As shown in said Fig. 10 and in Figs. 14 and 15, the hub A has at its end at which the sprocket is to be applied the somewhat thick and massive internal flange $s$, the central opening thereof having the radial ring $t$, with which engage the tenon-like extensions $u$, integrally formed with and protruding from the inner face of the sprocket-wheel. The engaging parts, as indicated in Figs. 13 and 14, may go together on a taper to take up for wear.

I claim—

1. The combination with a hub or barrel, of ball-cases removably provided in the ends thereof, a catch device operating between the hub and one of the ball-cases for detachably confining the said ball-cases against rotation in the hub, and a tube connected to one of the ball-cases and having a screw engagement with the other ball-case, substantially as described.

2. The combination with a hub or barrel of the removable annular ball-cases in the ends thereof, having outward extensions or flange-like portions to overlie the ends of the hub and one thereof having a series of recesses in said extension, of a spring-catch mounted on the end portion of the hub, and adapted to engage in said recesses, and the locking-tube connected to one of the ball-cases and having a screw engagement with the other, substantially as described.

3. The combination with the hub having in its end portion a longitudinal socket, a bar movable therein and having a laterally-extended knob, a spring for throwing the bar outward, and the ball-case fitted in the end of the hub and having the flange provided with the series of recesses in which said bar engages, substantially as described.

4. The combination with a hub or barrel, of a sprocket-wheel having an interlocking engagement with the end thereof, and an annular part constructed to form a ball-case, located within the central part of the sprocket-wheel, and having a portion thereof removably fitted in the end of the hub, a tube united to said ball-case, and extended endwise through the hub, and a second ball-case, fitted to be movable endwise and also rotatably within the other end of the hub, screw-engaging said tube, and having a portion thereof located externally of the hub, and means, coacting with said external portion of the second ball-case for locking it, at pleasure, against being turned, substantially as and for the purposes set forth.

5. The combination with the hub, and a ball-case fitted in the end of the hub, and a sprocket-wheel united to said ball-case, said sprocket-wheel and adjacent portion of the hub being provided, the one with longitudinal lugs or studs and the other with endwise-extending sockets, in which said lugs may engage, of the tube connected to the said ball-case, and a second ball-case which is rotatably fitted and endwise movable in the other end of the hub and which screw-engages said tube, substantially as described.

6. A ball-case having an annular raceway for the balls with its annular mouth of less width than the diameter of the balls, and having adjacent said raceway an annular groove with a niche leading transversely therefrom into the raceway in combination with a spring-ring adapted to be sprung into said groove and having a laterally-extended lip adapted to lie in said niche, substantially as described.

7. In a ball-bearing mechanism, the combination with a hub or barrel, and the ball-case and balls, of the shaft or axle having an externally-threaded portion, a longitudinal bore, a transverse slot, the collar, the rod, the pin transversely passed through the collar, said slot and through the rod, and means for confining the rod against endwise movement in the shaft, and the cone screw-threaded on the shaft and limited by said collar, substantially as described.

8. In a ball-bearing, the combination with a shaft or axle externally threaded and having a longitudinal bore opening to its one end and provided with a slot transversely intersecting the said bore, of a rod movable in said bore and having a transverse member extended outwardly through said slot and supporting a part externally of the axle which constitutes a shoulder or stop, the cone adapted to screw against said stop, and means for confining the rod against endwise movement.

9. In a ball-bearing, the combination with the axle externally screw-threaded, axially bored and having the transverse slot, of the collar, the cross-pin and the rod in the bore engaged by the pin, and a nut threading on the end portion of the rod and seating against the end of the shaft, substantially as described.

10. A ball-case having an annular raceway for the balls, with its mouth of less width than the diameter of the balls, and having a niche leading transversely into said raceway, in combination with a ring adapted to lie within the ball-case and having a lip to lie within said niche, and the balls, substantially as described.

In testimony that I claim the foregoing as my invention I have signed my name, in presence of two witnesses, this 16th day of September, 1896.

GEO. T. WARWICK.

Witnesses:
   WM. S. BELLOWS,
   N. M. BELLOWS.